United States Patent [19]

Leuschner et al.

[11] Patent Number: 4,464,982

[45] Date of Patent: Aug. 14, 1984

[54] ELECTRIC COFFEE MACHINE WITH CENTRIFUGAL FILTER

[75] Inventors: Udo Leuschner, Traunwalchen; Alfons Zinsberger, Laufen, both of Fed. Rep. of Germany

[73] Assignee: Bosch-Siemens Hausgeraete GmbH, Munich, Fed. Rep. of Germany

[21] Appl. No.: 421,022

[22] Filed: Sep. 21, 1982

[30] Foreign Application Priority Data

Sep. 22, 1981 [DE] Fed. Rep. of Germany ....... 3137666
Sep. 22, 1981 [DE] Fed. Rep. of Germany ....... 3137688

[51] Int. Cl.³ .............................................. A47J 31/00
[52] U.S. Cl. ................................... 99/287; 99/302 C
[58] Field of Search .................... 99/287, 302 C, 279, 99/302 R; 494/82; 426/433

[56] References Cited

U.S. PATENT DOCUMENTS 3,344,733 10/1967 Herrera ................................ 99/287
4,074,621 2/1978 Cailliot ................................ 99/287

FOREIGN PATENT DOCUMENTS 1117198 2/1956 France ................................ 99/287
601964 2/1960 Italy ................................ 99/302 C
609985 10/1960 Italy ................................ 99/302 C Primary Examiner—Robert W. Jenkins
Attorney, Agent, or Firm—Herbert L. Lerner; Laurence A. Greenberg

[57] ABSTRACT

Electric coffee machine with a centrifugal filter which, via a rotating transporter disposed thereon collects boiling water from a heated water bowl disposed therebelow, and with a casing surrounding the water bowl, comprising means for rotatably mounting the centrifugal filter on the water bowl, and elastic buffer elements moveably supporting the water bowl on the casing.

19 Claims, 1 Drawing Figure

U.S. Patent   Aug. 14, 1984   4,464,982
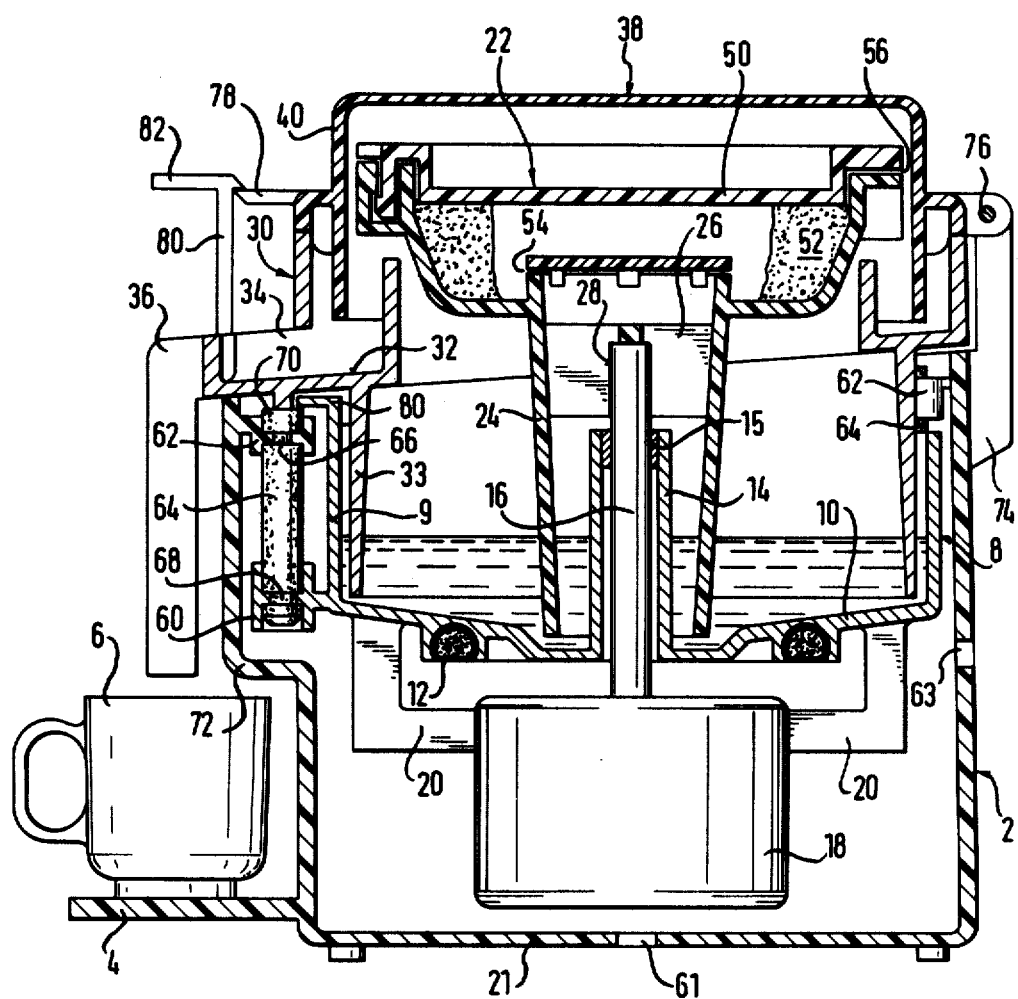

ELECTRIC COFFEE MACHINE WITH CENTRIFUGAL FILTER

The invention relates to an electric coffee machine with a centrifugal filter, which collects boiling water by means of a rotating transporter disposed thereon, for example, a rotating hollow cone from a heated water bowl located therebelow, as well as with a casing which encloses the water bowl.

A problem arises with such equipment that if the ground coffee has been spread unevenly, vibrations occur which, if transmitted to the casing of the equipment, can cause loud noises and movement of the equipment on the workplate. The vibrations can also damage the equipment in the course of time.

It is an object of the invention to provide a coffee machine of the hereinaforedescribed type in which the transmission or transfer of the vibrations of the centrifugal filter to the casing as well as noises due to movements of the parts of the casing relative to one another have been excluded to the greatest extent, yet with ordinary manufacturing expense and, especially, with slight assembly expense in manufacturing the equipment.

With the foregoing and other objects in view, there is provided, in accordance with the invention an electric coffee machine with a centrifugal filter which, via a rotating transporter disposed thereon, collects boiling water from a heated water bowl disposed therebelow. and with a casing surrounding the water bowl, comprising means for rotatably mounting the centrifugal filter on the water bowl and elastic buffer elements movably supporting the water bowl on the casing.

In accordance with another feature of the invention the rotating transporter is a rotating hollow cone. The assembly formed of the water bowl and the centrifugal filter mounted thereon can then oscillate or vibrate by itself in the casing without transferring the vibrations or oscillations to the casing. Furhtermore, a thermal decoupling of the heated water bowl and the casing is achieved by the buffer elements. In addition, the elastic support of this assembly offers the advantage that damage to the machine, due to faulty insertion of the centrifugal filter and due to application of pressure upon the centrifugal filter as a result of violent closing of the cover, is avoided because the water bowl-centrifugal filter assembly is able to yield in the support or mounting thereof.

In accordance with a further feature of the invention, the buffer elements are formed at least partly of foam rubber. An elastic material, such as rubber, for example, which exhibits especially good damping properties may, during manufacture, be dipped into an elastic coating material so as to form a closed surface.

In accordance with other features of the invention, the buffer elements are formed as buffer rods, and the water bowl is suspended by means of the buffer elements in the casing. Buffer rods of foam rubber suspended in the casing provide good decoupling of the water bowl and the casing and, simultaneously, good vibration damping.

In accordance with an added feature of the invention the buffer rods have end sections formed with projections and recesses, the water bowl and the casing being formed with corresponding button holders wherein the projections are buttoned. This affords a relatively simple assembly during manufacture.

In accordance with additional features of the invention, the buffer elements comprise support means for a ring-shaped collection chamber for coffee sprayed out of the centrifugal filter or for a casing cover or for both thereof. These casing parts thereby do not come into mutual contact, and noises which would otherwise result from striking one another and from moving against one another, respectively, are avoided and also the handling or manipulation by the user of the machine when making the brewing process ready is more noiseless and thereby pleasanter. The buffer elements thus assume several functions.

In accordance with yet another feature of the invention the buffer elements comprise support means for a cover of the casing, the casing cover being seated on the collection chamber and being lockable with the casing, the casing cover in closed and locked condition thereof, pressing the collection chamber against the buffer elements.

In accordance with yet another feature of the invention the buffer elements are shaped as rods formed with end sections projecting through button holders formed on the casing, the projecting end sections being the support means.

Thereby, all of the parts are firmly clamped to one another to prevent rattling noises, the buffer elements having the additional purpose of furnishing the elastic prestress therefor.

In accordance with yet an added feature of the invention, the coffee machine includes an electric motor for driving the centrifugal filter, the electric motor being fastened to the water bowl. The electric motor also is then movable together with the water bowl.

In accordance with yet an additional feature of the invention, three of the buffer elements are distributed about the periphery of the water bowl, one of the buffer elements being disposed in a region between the water bowl and an outlet of a collection chamber for coffee sprayed therein from the centrifugal filter.

In accordance with another feature of the invention the one buffer element is disposed in a forwardly projecting part of the casing, coffee receiving containers being slidable at least partly under the forwardly projecting part of the casing. The outlet or coffee-spout can then, in front of the buffer element, be guided downwardly into the region of the lower end of the projecting part of the casing in order to prevent as much as possible the spraying of drops of the coffee stream into the surrounding area.

In accordance with a further feature of the invention, the buffer elements are formed as rods, the buffer rods extending lengthwise parallel to the rotary axis of the centrifugal filter.

If the water bowl is disposed so as to be elastically movable at a spaced distance from the casing walls, this has the disadvantage that the centrifugal filter, during the rotation thereof, will suck air out of the casing and past the water bowl and can transport the air to the outlet or coffee-spout. Part of this air sweeps over the surface of the water in the water bowl and cools the brewing water down.

It is accordingly a further object of the invention to prevent air circulation or draft in the water bowl or at least to reduce it to the greatest extent in such a coffee machine.

In accordance with another feature of the invention, therefore, the casing is formed with an air-tight ring wall dipping into the water bowl to reach the bottom thereof. This air-tight ring wall, together with the water, forms a seal which prevents air flow throughout the maximum part of the brewing operation.

In accordance with further features of the invention, in the non-operating or rest condition of the machine, the ring wall is spaced a distance of from substantially 4 to substantially 8 mm, preferably substantially 6 mm, from the side wall of the water bowl. This thereby prevents water in the annular space between the side wall of the water bowl and the ring wall from shaking or jarring upwardly and running over the edge of the water bowl due to vibrations which would otherwise effect relative movements between the side wall of the water bowl and the ring wall.

In accordance with an additional feature of the invention the casing has, above the water bowl, a ring-shaped collection chamber for coffee sprayed therein from the centrifugal filter, the collection chamber having a bottom from which a ringwall projects downwardly. This feature results from the fact that the collecting chamber overlaps the water bowl inwardly.

In accordance with a concomitant feature of the invention, the water bowl has stop projections engageable with respective ends of the buffer elements located at the side of the casing so as to limit elastic movements of the water bowl.

Other features which are considered as characteristic for the invention are set forth in the appended claims.

Although the invention is illustrated and described herein as embodied in an electric coffee machine with centrifugal filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments, when read in connection with the accompanying single feature of the drawing which is a vertical sectional view of the electric coffee machine with a centrifugal filter, according to the invention, the sectional plane being substantially through the rotary shaft thereof.

Referring now to the FIGURE of the drawing, the electric coffee machine shown therein has a pot-shaped generally rectangular socket casing 2 as viewed from above, having a horizontal base or platform 4 with room for two coffee cups 6 disposed adjacent one another, the platform 4 being attached laterally to the casing 2 at a lower region thereof. Inside the socket casing 2 is a water bowl 8 which has a bottom 10 sloping downwardly towards the middle thereof, an electric heater 12 being disposed at the underside of the bottom 10. In a middle region of the bowl 8, the bottom 10 merges into a tube extension 14 through which a vertical shaft 16 of an electric motor 18 projects. The electric motor 18 is held by supports 20, which are formed at the underside of the bottom 10 of the water bowl 8.

A bearing 15 for the shaft 16 is disposed in the tube extension 14.

A centrifugal filter 22 has a downwardly tapering hollow cone 24 projecting downwardly into the water bowl 8 and serving as the feeding device for the boiling water.

A ribbed or finned star 26 is formed within the hollow cone 24 and has a central recess 28 into which the upper end of the shaft 16 is clampingly receivable in order to center the centrifugal filter 22 on the shaft 16 in entraining engagement.

The water bowl 8 has three protruding eye or button-holders 60, respectively, extending horizontally and laterally outwardly from the bottom. The socket casing 2 has three eye and button-holders 62 projecting horizontally inwardly and disposed in spaced relationship thereabove.

The button-holders 60 and 62 are respectively connected to one another by an elastic buffer element 64, formed of foam rubber and having thereon a sealed coating of silicon rubber formed by dipping in a suitable bath. The buffer elements 64 are somewhat rod-shaped and are formed on upper and lower end sections thereof with necked down or reduced portions 66 and 68, which are buttoned into inwardly projecting annular ribs of the button holders 60 and 62. A head 70 of the buffer element 64 projects, respectively, upwardly above the button holders 62 formed on the socket casing 2 and provides a seat or support for a collection chamber 30. The collection chamber 30 has a base 32 which slopes downwardly i.e. frontwards, towards the platform or support surface 4 for the coffee cups, and an outlet channel 34 projecting radially outwardly frontwards, which branches into two spouts or outlets 36. One of the three buffer elements 64 is disposed immediately behind the spouts 36 in a protruding bay or alcove 72 of the socket casing 2, under which the coffee cups 6 are partly slidable. The spouts 36 project downwardly into a lower region of the bay 72. The socket casing 2 has a rectangular cross section and both of the buffer elements 64 which are located away from the spouts 36 are disposed between the water bowl 8, which appears somewhat circular ring-shaped in plan view, and the rear corners of the casing 2. The front buffer 64 can be placed optically concealed behind the spout in a protruding part 72 of the casing 2 without enlargement of the base area of the equipment altogether, because the spouts have to project anyway to about above the middle of the coffee cups, which have been placed underneath. The figure of the drawing, however, shows only one spout 36 because it is a cross-sectional view. On top of the collection chamber 30 there is a cover 38 with a downwardly projecting cylindrical ringwall 40 which extends downwardly into the ring-shaped collection chamber 30 and collects the coffee which is centrifuged out of the centrifugal-filter and directed downwardly into the ring-shaped collection chamber 30. From the bottom 32 of the collection chamber 30, a sealed ringwall 33 extending concentrically to the shaft 16 projects downwardly into the water bowl 8 and ends a short distance above the bottom 10. The distance or spacing between the ringwall 33 and the side wall 9 of the water bowl 8 concentric therewith is 6 mm when the equipment is not in operation.

The equipment casing 2 has upwardly protruding bearing attachments 74 at the rear side thereof, with a swivel bearing 76 for the cover 38. In a front region thereof, the cover 38 has a forwardly projecting locking arm 78, which is lockable with an elastic locking hook 80 formed on the socket casing 2. The cover 38 locks itself automatically if it is swung downwardly and pressed lightly downwardly against the prestressing of the elastic heads 70 and buffer elements 64. A release or unlocking lug 82 projecting forwardly from the locking hook 80 is downwardly pressable or forwardly drawable in order to release or disengage the locking of the cover 38.

The socket casing 2 is formed in the bottom 21 thereof with an air venting and water draining opening 61, at a middle level, with air vents 63 to ensure the feeding of cooling air to the motor 18.

The operation of the coffee machine is described hereinbelow: After the cover 38 has been removed and the centrifugal filter 22 has been withdrawn from the shaft 16, fresh water is poured into the waterbowl 8 from above. Then, after removing the cover 50 of the centrifugal filter 22, the ground coffee 52 can be poured into the latter. The centrifugal filter 22 is then stuck onto the shaft 16 and the cover 38 replaced, and two cups are placed below the spouts 36 onto the platform or base 4. After switching on the machine, at first only the heater 12 is started. As soon as a non-illustrated conventional control establishes or determines that the water is hot enough, the motor is started and accelerates the centrifugal filter 22. Initially, the coffee grains 52 are distributed in ring-shaped fashion, as illustrated and as described hereinbefore. As soon as sufficient rotary speed of the centrifugal filter 22 has been reached, the hollow cone 24 begins to transport or draw in the boiling water and fling it through a ring-shaped slot 54 formed at the upper end thereof onto the ring 52 of ground coffee. The prepared or completed coffee brew discharges from the centrifugal filter 22 through a ring-shaped slot 56 and is collected by the ring wall 40 of the cover 38 and guided downwardly into the collection chamber 30, from which it flows through the channel 34 and the spouts 36 into the coffee cups 6.

The three suspended buffer rods 64 extend parallel to one another and parallel to the motor shaft 16 and the rotary axis of the centrifugal filter 22, respectively.

The water bowl 8 has the extension 80 projecting from the side wall 9 thereof for a length upwardly and then radially outwardly, which, when the equipment is not in operation, is located a distance above the heads 70 of the buffer elements 64 as well as a distance from the collection chamber 30. These extensions 80 serve as stops which cooperate with the heads 70 of the buffer elements 64, if too much pressure is exerted somewhat in an axial direction downwardly, for example, when the centrifugal filter 22 is introduced into the water bowl 8. Excessive stressing of the buffer elements 64 or a loosening or releasing of the latter from the button holders 60 and 62 is thereby avoided. In a variation or modification of the illustrated and described embodiment, the heads 70 may also be formed somewhat larger and extensions may reach downwardly from the stops 80 and may strike against the heads 70 when lateral swinging of the waterbowl is too great, for example, due to imbalances in the centrifugal filter 22.

The foregoing is a description corresponding to German Application Nos. P 31 37 666.5 and P 31 37 688.6, both dated Sept. 22, 1981, the International Priority of which is being claimed for the instant application and which is thereby made part of this application. Any discrepancies between the foregoing specification and the aforementioned corresponding German applications are to be resolved in favor of the latter.

We claim:

1. Electric coffee machine with a centrifugal filter, a heated water bowl disposed therebelow, a rotatable transporter intermediate to the water bowl and the centrifugal filter for transporting boiling water from the heated water bowl to the centrifugal filter, and with a casing surrounding the water bowl, comprising means for mounting the centrifugal filter on the water bowl, means for rotating the centrifugal filter relative to the water bowl, and elastic buffer elements yieldingly supporting the water bowl on the casing.

2. Coffee machine according to claim 1 wherein the rotating transporter is a rotating hollow cone.

3. Coffee machine according to claim 1 wherein said buffer elements are formed at least partly of foam rubber.

4. Coffee machine according to claim 1 wherein said buffer elements are rod shaped.

5. Coffee machine according to claim 4 wherein said elastic buffer rods have a central section and respective end sections spaced from said central section by respective lengths of said rods having a reduced cross section bowl and the casing being formed with openings having a cross section smaller than that of said end sections through which said end sections are squeezable so as to engage therebehind.

6. Coffee machine according to claim 1 wherein the water bowl is suspended by means of said buffer elements in the casing.

7. Coffee machine according to claim 1 wherein said buffer elements comprise support means for a ring-shaped collection chamber for coffee sprayed from said centrifugal filter.

8. Coffee machine according to claim 7 wherein said buffer elements comprise support means for a cover of the casing and are disposed adjacent and below said collection chamber, said casing cover being seated on said collection chamber and being lockable with the casing, said casing cover, in closed and locked condition thereof, pressing said collection chamber against said buffer elements.

9. Coffee machine according to claim 8 wherein said buffer elements are shaped as rods having a central section and formed with end sections spaced by lengths of reduced cross section from said central section, said end sections projecting through openings formed in the casing, said projecting end sections being said support means.

10. Coffee machine according to claim 1 wherein said buffer elements comprise support means for a cover of the casing.

11. Coffee machine according to claim 1 including an electric motor for driving the centrifugal filter, said electric motor being fastened to the water bowl.

12. Coffee machine according to claim 1 wherein three of the buffer elements are distributed about the periphery of the water bowl, one of the buffer elements being disposed in a region between the water bowl and an outlet of a collection chamber for coffee sprayed therein from the centrifugal filter.

13. Coffee machine according to claim 12 wherein said one buffer element is disposed in a forwardly projecting part of the casing, coffee-receiving containers being slidable at least partly under said forwardly projecting part of the casing.

14. Coffee machine according to claim 1 wherein the buffer elements are formed as rods, said buffer rods extending lengthwise parallel to the rotary axis of the centrifugal filter.

15. Coffee machine according to claim 1 wherein the casing is formed with an air-tight ring wall dipping into the water bowl to nearly the bottom thereof.

16. Coffee machine according to claim 15 wherein, in non-operating condition of the machine, said ring wall is spaced a distance of from substantially 4 to substantially 8 mm from the side wall of the water bowl.

17. Coffee machine according to claim 15 wherein said spaced distance is substantially 6 mm.

18. Coffee machine according to claim 15 wherein the casing has, above the water bowl, a ring-shaped collection chamber for coffee sprayed therein from the centrifugal filter, said collection chamber having a bottom from which a ringwall projects downwardly.

19. Coffee machine according to claim 1 wherein the water bowl has stop projections engageable with respective ends of the buffer elements located at the side of the casing so as to limit elastic movements of the water bowl.

* * * * *